United States Patent
Vierk et al.

(10) Patent No.: US 9,771,984 B2
(45) Date of Patent: Sep. 26, 2017

(54) DUAL GAIN FRICTION CLUTCH

(71) Applicant: BorgWarner Inc., Auburn Hills, MI (US)

(72) Inventors: David T. Vierk, Mokena, IL (US); Steven J. Kowal, Naperville, IL (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/114,155

(22) PCT Filed: Jan. 28, 2015

(86) PCT No.: PCT/US2015/013297
§ 371 (c)(1),
(2) Date: Jul. 26, 2016

(87) PCT Pub. No.: WO2015/116684
PCT Pub. Date: Aug. 6, 2015

(65) Prior Publication Data
US 2016/0363175 A1    Dec. 15, 2016

Related U.S. Application Data

(60) Provisional application No. 61/933,545, filed on Jan. 30, 2014.

(51) Int. Cl.
*F16D 25/0638* (2006.01)
*F16D 13/52* (2006.01)
(Continued)

(52) U.S. Cl.
CPC .......... *F16D 13/52* (2013.01); *F16D 13/683* (2013.01); *F16D 13/75* (2013.01); *F16D 21/06* (2013.01)

(58) Field of Classification Search
CPC .......... F16D 13/52; F16D 13/75; F16D 21/06; F16D 13/683
See application file for complete search history.

(56) References Cited

U.S. PATENT DOCUMENTS 4,550,817 A * 11/1985 Euler ..................... F16D 13/38
192/70.23
4,564,994 A * 1/1986 Marx ..................... B23P 19/002
269/47
(Continued)

OTHER PUBLICATIONS

International Search Report for related International Application No. PCT/US2015/013297; report dated May 1, 2015.

*Primary Examiner* — David J Hlavka
(74) *Attorney, Agent, or Firm* — Miller, Matthias & Hull LLP

(57) ABSTRACT

A dual gain friction clutch is adapted to transmit an operational range of torques from a drive member to a driven member. The dual gain friction clutch incorporates a first friction clutch pack and a second friction clutch pack, the pack being axially aligned and adapted to address one of two segments of the operational range of torques. The clutch further includes a spring-loaded skate detent unit configured to control transition between the two segments of operational ranges of torques. Each friction clutch pack may include identical respective friction discs coupled to the drive member and respective pressure plates coupled to the driven member for selectively providing torque control within either of the lower and higher segments of the operational ranges of torques. The first clutch pack is configured to operate alone and independently of the second clutch pack during the lower segment of operational range of torques while and both friction clutch packs are configured to operate as a single combined friction clutch unit during the higher segment of operational range of torques.

13 Claims, 2 Drawing Sheets

(51) Int. Cl.
*F16D 13/68* (2006.01)
*F16D 21/06* (2006.01)
*F16D 13/75* (2006.01)

(56) References Cited

U.S. PATENT DOCUMENTS

| | | | | |
|---|---|---|---|---|
| 5,234,087 | A * | 8/1993 | Jurgens | F16D 25/0638 192/3.58 |
| 5,469,943 | A * | 11/1995 | Hill | F16D 55/40 188/264 D |
| 6,227,340 | B1 * | 5/2001 | Braford, Jr. | F16D 25/0638 192/48.1 |
| 6,702,081 | B2 * | 3/2004 | Gorman | F16D 25/0638 192/109 R |
| 6,817,460 | B2 * | 11/2004 | Shoji | F16D 25/0638 192/85.34 |
| 7,104,380 | B2 | 9/2006 | Bishop et al. | |
| 7,350,633 | B2 * | 4/2008 | Portell | F16D 25/0638 188/71.5 |
| 8,561,772 | B2 * | 10/2013 | Papania | F16D 41/00 192/48.3 |
| 2004/0198548 | A1 | 10/2004 | Showalter et al. | |
| 2009/0209150 | A1 | 8/2009 | Yukishima | |
| 2011/0319226 | A1 | 12/2011 | Brevick et al. | |
| 2012/0234642 | A1 | 9/2012 | Sekine et al. | |
| 2013/0267372 | A1 * | 10/2013 | Mellet | F16H 3/62 475/276 |

* cited by examiner

DUAL GAIN FRICTION CLUTCH

CROSS-REFERENCE TO RELATED APPLICATION

This is a U.S. National Stage Application filed under 35 USC 371 based on International Application No. PCT/US2015/013297 filed on Jan. 28, 2015, which claims priority to U.S. Provisional Patent Application No. 61/933,545 filed on Jan. 30, 2014.

FIELD OF THE DISCLOSURE

The present disclosure generally relates to dual gain friction clutches employed in transmissions for transmitting torque in vehicles, and more particularly to friction clutch devices configured for managing multiple torque gain levels.

BACKGROUND OF THE DISCLOSURE

Clutches are used to control transmittal of torque in vehicles. In a vehicle having an automatic transmission, for example, multiple clutches are used to engage or disengage selected gearsets in real time to obtain desired gear ratios. Clutches used for this purpose generally include a plurality of rotatable friction discs employed as drive members internally splined to and axially moveable on a rotatable hub. A case or housing is coaxially aligned with the hub and supported for rotation independently of the hub. Driven reaction or pressure or plates are externally splined to the housing, and are interposed between the friction discs to form rotatable drive and driven elements alternately arranged on a common axis. The friction discs generally include a friction material layer on one or both sides of the plates. An actuator, including a hydraulic piston, may be adapted to apply a piston force to press the drive and driven elements into engagement, thereby permitting torque to be transferred from the hub to the housing.

It has been known how to provide dual gain capability with respect to friction disc and pressure plate clutch structures. For example, U.S. Pat. No. 6,227,340 B1 discloses a hydraulic fluid operated friction coupling comprising a multiple friction disc assembly. The multiple friction disc assembly includes a single piston actuator, and has first and second springs operatively configured and arranged in response to pressurization of the piston actuator to selectively engage first and second sets of plates and friction components, called clutch packs, for varying the gain of the coupling. Two separate Belleville springs are employed with the clutch packs, including one interposed between the two axially arranged clutch packs employed. The elimination of one of those relative bulky spring structures could facilitate use of shorter axial dimensions for such friction couplings, as those skilled in the art may appreciate.

SUMMARY OF THE DISCLOSURE

In accordance with one aspect the disclosure, a dual gain friction clutch is provided for transmitting an operational range of torques from a drive member to a driven member. The dual gain friction clutch incorporates two axially juxtaposed sets of friction discs and pressure plates, hereinafter called first and second friction clutch packs, configured to effectively produce two distinct operational ranges of torques. Thus, the first friction clutch pack includes at least one friction disc element coupled to the drive member and at least one pressure plate element coupled to the driven member for torque control within a first lower operational range of torques. During clutching performance in the lower operational range of torques, only the first friction clutch pack will be active.

In accordance with another aspect of the disclosure, the second friction clutch pack similarly includes a friction disc coupled to the drive member and a pressure plate coupled to the driven member, the second friction clutch pack being configured to, in concert with the first friction clutch pack, handle a second higher operational range of torques. Transition from a first lower to a second higher operational range of torques is controlled by a spring-loaded skate detent unit. In the second higher operational range of torques, the serially positioned first and second friction clutch packs are configured to operate in concert; i.e., together as a combined clutch unit.

In accordance with another aspect of the disclosure, an actuator assembly is operatively configured to sequentially engage the first friction clutch pack, and then the second friction clutch pack in combination with the first. The actuator assembly is configured to move the first friction clutch pack from a disengaged position to a first torque transmitting position involving the first lower operational range of torques, and then to sequentially transition the second clutch pack from a disengaged to an engaged position to, in concert with the first clutch pack, achieve a second torque transmitting mode involving the higher operational range of torques.

In accordance with yet another aspect of the disclosure, a dual gain friction clutch for transmitting an operational range of torques from a drive member to a driven member incorporates a spring loaded skate detent unit to effectuate transition between the first lower operational range of torques and the second higher operational range of torques.

These and other aspects and features of the disclosure will become more apparent upon reference to the following detailed description and accompanying drawings.

Figure 1:
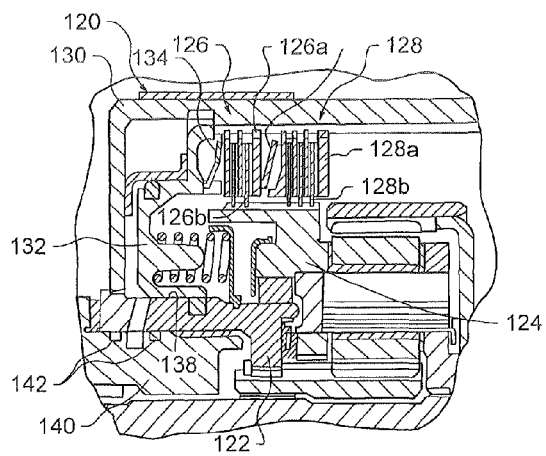
FIG. 1 is a fragmentary sectional view of a prior art dual gain friction clutch.

The various illustrative embodiments of the present disclosure, as depicted in the drawings and described in detail herein, are susceptible to modifications and alternative constructions. As such, numerous equivalent constructions may fall within the spirit and scope of the present disclosure.

DETAILED DESCRIPTION

To provide background context for comparison purposes, a schematic representation of a prior art dual gain friction clutch 120 is shown in FIG. 1. The clutch 120, configured for an automatic transmission assembly (not shown), is interposed between an input 122 and an output 124.

The clutch 120 has a first set of reaction or pressure plates and friction discs defining a first clutch pack 126, and a second set of separate plates and friction discs, defining a second clutch pack 128. The clutch packs 126, 128 are housed in an axially juxtaposed arrangement within a rotating housing 130 which is geared to the input 122, as shown. The first and second sets of pressure plates of respective first and second clutch packs 126, 128 are externally splined to the rotating housing 130, while the respective first and second sets of friction discs are internally splined to the output 124. As such, each of the sets is defined by externally splined pressure plates 126a, 128a connected to the rotating housing 130, as well as internally splined friction discs 126b, 128b connected to the output 124.

A piston 132 is hydraulically pressurized to cause engagement of the first clutch pack 126, so that the latter becomes operative within a first lower range of torques. At a transitional point, the applied force of the piston 132 becomes great enough to overcome a greater spring force of a second spring 136 situated axially between the two clutch packs 126, 128, causing the second clutch pack 128 to become engaged simultaneously with the continued engagement of the first clutch pack 126.

In the described clutch 120, hydraulic actuation pressure is applied to a piston cylinder 138, causing the piston 132 to bear against the first spring 134 and ultimately against the second spring 136. For this purpose, hydraulic fluid is supplied through a stationary member 140 that is hydraulically sealed with respect to the rotating housing 130 by hydraulic fluid seals 142.

Figure 2:
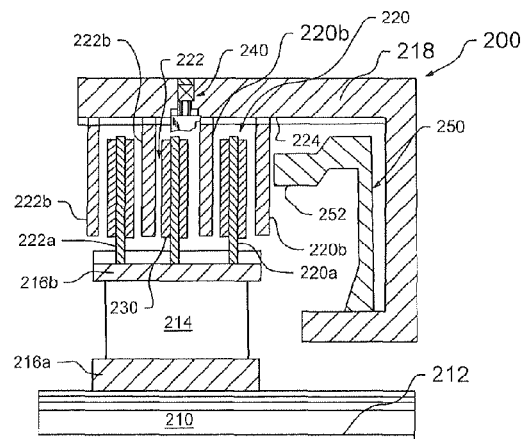
FIG. 2 is a schematic representation of a disengaged dual gain friction clutch that may be constructed in accordance with the present disclosure.

Referring now to FIG. 2, the dual gain friction clutch 200 of this disclosure is circumferentially situated about a power or drive shaft 210 adapted to rotate about an axis 212. It will be noted that the orientation of the dual gain friction clutch 200 is axially reversed from that of the first described prior art embodiment of the dual gain friction clutch 120 of FIG. 1.

The clutch 200, shown in a fully disengaged state, has an internally splined hub 214 attached to and rotatable with the drive shaft 210 via splines 216a. The hub 214 may be provided as a simple annular flange coupled to the drive shaft 210, or the hub may be configured to provide additional features or capabilities, such as a one-way clutch (not shown). An exterior peripheral surface of the hub 214 is defined by splines 216b. The friction clutch 200 may also include a case or housing 218 mounted coaxially with the drive shaft 210 and may be supported for rotation about the axis 212 independently of the drive shaft. In accordance with this embodiment, the drive shaft 210 is the drive or power input member, while the housing 218 acts as the driven or output member.

Continuing reference to FIG. 2, the dual gain friction clutch 200 is configured to transfer torque from the hub 214 to the housing 218. The dual gain friction clutch 200 includes a first friction clutch pack 220 and a second friction clutch pack 222, the two clutch packs 220, 222 being coaxially arranged for selectively controlled operation in series about the axis 212. Each of the clutch packs 220, 222 includes one set of first and second friction elements interleaved in torque transfer engagement. For example, each clutch pack may have one or more internally splined friction discs 220a and 222a respectively coupled to the hub 214. Each friction disc 220a, 222a may include friction surfaces 230 on both sides of the disc. Alternatively, only one side of each friction disc may include a friction surface 230.

Correspondingly, each clutch pack 220, 222 may have one or more externally splined pressure plates 220b, 222b splined to the housing 218 such that each pressure plate 220b, 222b is interleaved between adjacent friction discs 220a, and 222a. The respective discs and plates (only one of each being schematically shown in each clutch pack 220, 222) are adapted to slide axially with respect to one another while remaining attached to and rotatable with the hub 214 and housing 218, respectively. Accordingly, the respective discs and plates are movable between an unengaged position, in which the discs and plates do not frictionally engage each other, and a torque transmitting position, in which the discs and plates are adapted to actively engage each other with sufficient force to transmit torque.

In a first low operational range of torques, the first clutch pack 220 is configured to operate alone i.e. without any involvement or engagement of the second clutch pack 222. However, the second friction clutch pack 222 is movable from a disengaged position to an engaged position in which the second clutch pack 222 may sequentially operate in concert with the first clutch pack 220. As such, the two clutch packs are configured to work together as a combined unit to frictionally secure the hub 214 to the housing 218 in a second, higher, operational range of torques. According to the exemplary embodiment of FIG. 2, the second friction clutch pack 222 has twice the number of interleaved discs 222a and plates 222b as the first clutch pack 220. Within the scope of this invention, however, the respective numbers of discs and plates may be even greater than shown herein, and thus may be adapted to carry even greater amounts of torque, particularly during operation in concert with the first clutch pack 220 for enhanced performance within the high operational range of torques. Alternatively, the clutch packs 220, 222 may have an identical numbers of discs and plates.

The dual gain friction clutch 200 further includes an actuator assembly 250 provided for first actuating the first friction clutch pack 220 and thereafter sequentially, hence serially, actuating the second friction clutch pack 222. Thus in the illustrated embodiment, the actuator assembly 250 may include a hydraulic piston 252 controllably moved by pressure of hydraulic fluid disposed in a chamber 254 situated between the piston 252 and the housing 218, as will be appreciated by those skilled in the art.

The above-described dual gain friction clutch 200 is configured to provide clutching capability in a first friction clutch operational mode and a second friction clutch operational mode, the latter employing combined operational clutch packs 220, 222 within the second operational ranges of torques. During operation, the actuator piston 252 is adapted to axially bear against the first clutch pack 220. This action will compress the respective discs and plates 220a and 220b together, causing the first clutch pack 220 to engage. Initially, the force generated by the piston 252 will not exceed the reactions spring force of a skate detent 240 (explained in detail below), and therefore the clutch pack 220 will not be translated axially against the second friction clutch pack 222. As such, the first clutch pack 220 will function alone to handle the first lower operational range of torques.

However, when the hydraulic force applied against the piston 252 becomes sufficiently large, a left-most pressure plate 220b will interact with and operatively depress the skate detent 240, allowing the first clutch pack to move toward and become frictionally engaged with the second clutch pack 222. As such, the first and second clutch packs 220, 222 will be compressed together so as to operate as a single combined clutch pack unit to accommodate the second, higher range of torques.

Figure 3:
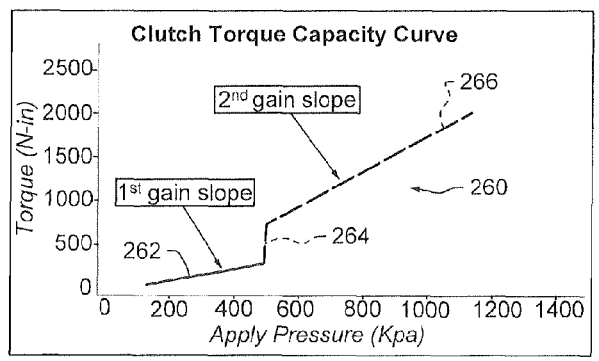
FIG. 3 is an exemplary graphical plot of torque vs. actuator piston "apply" pressure for the dual gain friction clutch of FIG. 2.

A torque gain curve 260, representative of a full spectrum of operational torques that may be provided by the dual gain friction clutch 200, is provided in FIG. 3 to graphically illustrate a relationship between actuator pressure and torque as produced by the clutch 200. A lower operational range of torques 262 is reflected by a first or slightly inclined segment of the gain curve 260, during operation of the first friction clutch pack 220, only. Beyond a transition portion 264 of the torque gain curve 260, the dual gain friction clutch 200 transitions to a combined first and second clutch pack mode of operation, as represented by a second, more steeply inclined, segment 266. The combined clutch pack mode is employed during the second higher operational range of torques. For the embodiments disclosed, the transition portion 264 may be established primarily by the force dynamics of the spring-loaded skate detent unit 240, which may conveniently be selected and adjusted to achieve a desired result.

Continuing reference to FIG. 3, the relatively smaller slope of the first segment 262 reveals that the disclosed dual gain friction clutch 200 can be designed to be less sensitive to changes in actuator pressure within the lower operational range of torques. In the disclosed embodiment, it may be apparent to those skilled in the art that sensitivity and hence controllability issues may diminish for the higher torques, and thus use of the combined clutch packs 220, 222 may accordingly be more advantageously employed to accommodate the latter higher range of torques.

Figure 4:
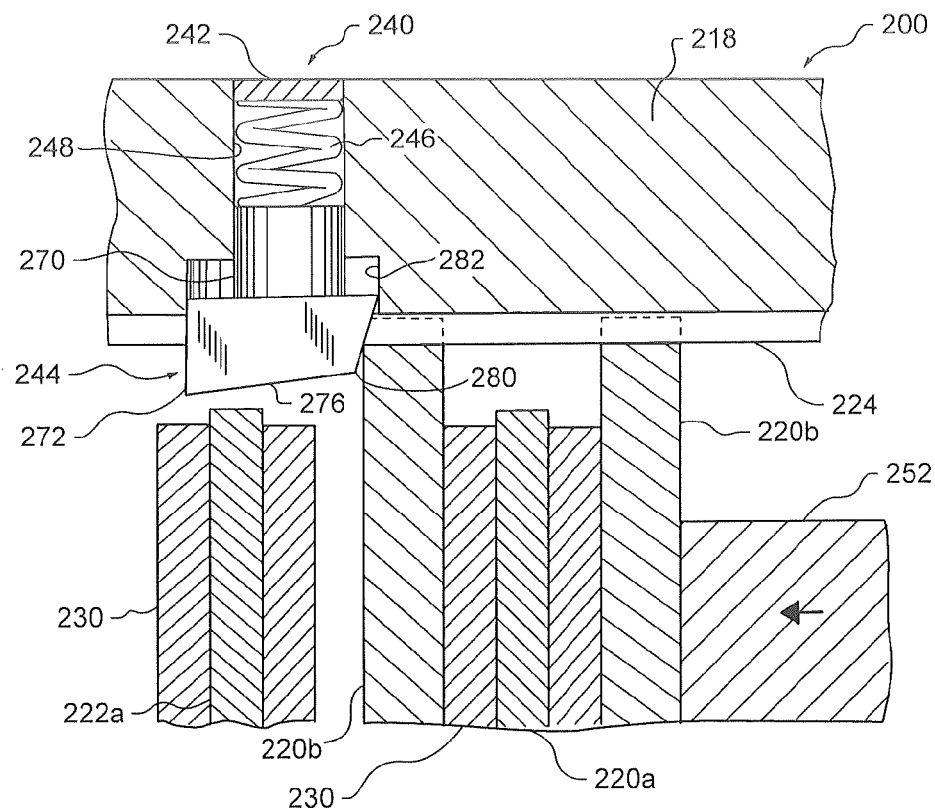
FIG. 4 is an enlarged view of several components of the dual gain friction clutch of FIG. 2, but shown engaged in a first, lower, segment of an operating range of torques.

Referring now also to FIG. 4, the dual gain friction clutch 200 may be configured as a transmission clutch unit for transmitting the operational range of torques 260 (FIG. 3) from a drive member 214 (FIG. 2) to a driven member 218. Fundamentally, the operational characteristics of the dual gain friction clutch 220 are similar to those of the earlier described dual gain friction clutch of FIG. 1. However, supported within the driven housing 218 of the clutch 200 is a spring-loaded skate detent unit 240 in lieu of the earlier described second spring 136 (FIG. 1). The skate detent unit is configured to interact with the left-most externally splined pressure plate 220b of the first clutch pack 220.

Although only one radially oriented skate detent unit 240 is depicted in FIGS. 2 and 4, a plurality of such skate detent units 240 may be uniformly spaced circumferentially about the interior wall 224 of the housing 218. Thus, by way of example, with use of two skate detents, coaxially located, but circumferentially spaced, the angular spacing between them would be 180 degrees, while with three skate detents, the detent spacing would be 120°, etc. Of course, alternatively the skates may be non-uniformly spaced, e.g. arranged in sets of pairs about the interior circumference of the housing 218, for example.

Collectively, the plurality of skate detent units may operate as a system of skate detents. In fact, the actual number of skate detent units employed in any given application can be a function of amount of counteracting or resistive force desired to achieve successful transition between modes. Indeed, any such required resistive force would determine the actual transition or inflection point 264 of the torque gain curve (FIG. 3).

As disclosed, each individual skate detent unit 240 incorporates a fixed spring reaction member 242 and a skate 244 urged radially by a spring 246 (represented by an X). The spring 246 may be embodied as a coil, or may have any variety of other forms, as those skilled in the art may appreciate. The spring is interposed between the skate 244 and the reaction member 242. All elements of the skate detent unit 240 are contained within an aperture 248 that extends radially within the interior wall 224 of the housing 218. The spring 246 is thus configured and positioned to radially load the skate 244 against the reaction member 242 upon which it is seated. The skate 244 may be secured within the inside of the aperture, i.e. from falling into the interior of the housing 218, by a washer (not shown) that extends circumferentially within a slot (not shown) in an anchor portion 270 of the skate 244. For this purpose, the aperture 248 may have a cooperating slot (not shown) in an internal diameter thereof to limit amount of extension of the skate 244 from the interior wall 224. Alternatively, and although not described herein, other means of securing structures such as the skate 244 and the skate anchor portion 270 within the aperture 248 may be employed.

The skate detent units 240 permit the friction clutch packs 220, 222 to be axially positioned closer together, compared to the friction packs 126, 128 of FIG. 1, which have the spring 136 interposed between the packs. The earlier described clutch 120 requires axial spacing between the clutch packs 126, 128 at least equal to the axial distance required to collapse the spring 136 (FIG. 1), because the respective clutch packs 126, 128 must be moved together at least that distance. Conversely, use of the radially oriented spring-loaded skate units 240 allows for the elimination of the spring 136. Since relatively less axial spacing is required, the clutch 200 may be configured with reduced axial dimensions.

Continuing reference to FIGS. 2 and 4, physical aspects and operation of the skate detent units 240 may now be fully described in detail. In order to initiate engagement of the dual gain friction clutch 200, the actuator assembly 250 is hydraulically moved leftwardly, and the piston 252 is configured to bear against the outer or right-most externally splined pressure plate 220b of the first friction clutch pack 220, as best shown in FIG. 2. In turn, that pressure plate 220b moves leftward until it contacts the internally splined friction disc 220a, sandwiching the latter disc against the left-most pressure plate 220b of the first clutch pack 220.

As noted earlier, during operation within the first lower torque mode, the first friction clutch pack 220 accommodates the lower segment of torques 262 (FIG. 3) without any engagement and/or assistance of the second clutch pack 222. This is because while the clutch 200 is performing within its lower operational range of torque 262, the actuator pressure against skate detent units 240 will be insufficient to collectively depress the individual skates 244 into the housing 218.

Once the actuator pressure has reached the transition portion 264 of the gain curve 260 (FIG. 3), the skates 244 will be collectively forced radially outward against the skate detent springs 246 by the then sufficiently increased force produced by the left-most pressure plate 220b of the first clutch pack 220. This action will urge the skates radially outward against the force of the springs 246 into recesses 282 of the housing 218, to then permit the two clutch packs to come together to work as though a combined, higher rated, single clutch pack unit.

Each skate detent unit 240 includes an individual skate 244, each skate being defined by a skate anchor portion 270 and base portion 272 integrally attached to the anchor portion. The anchor portion 270 projects into the aperture 248 against the force of the spring 246. The base portion 272 is configured to be forced radially into the aperture 248 by the left-most plate 220b as the plate attempts to move leftward against the skate 244 under hydraulic force of the piston 252. The plate 220b can only be so transitioned, i.e.

moved under the skates 244, when the piston force reaches the level corresponding to the transition portion 262 of the gain curve 260 (FIG. 3).

The base portion 272 of the skate 244 includes a leading edge 274, relatively steeply angled as shown to resist movement of the left-most plate 220*b* during the first lower operational range of torque, as shown in FIG. 4. It will also be noted that a bottom edge 276 has a shallower angle to provide a return force, hence to return the respective discs and plates to their pre-transition force level positions.

Figure 5:
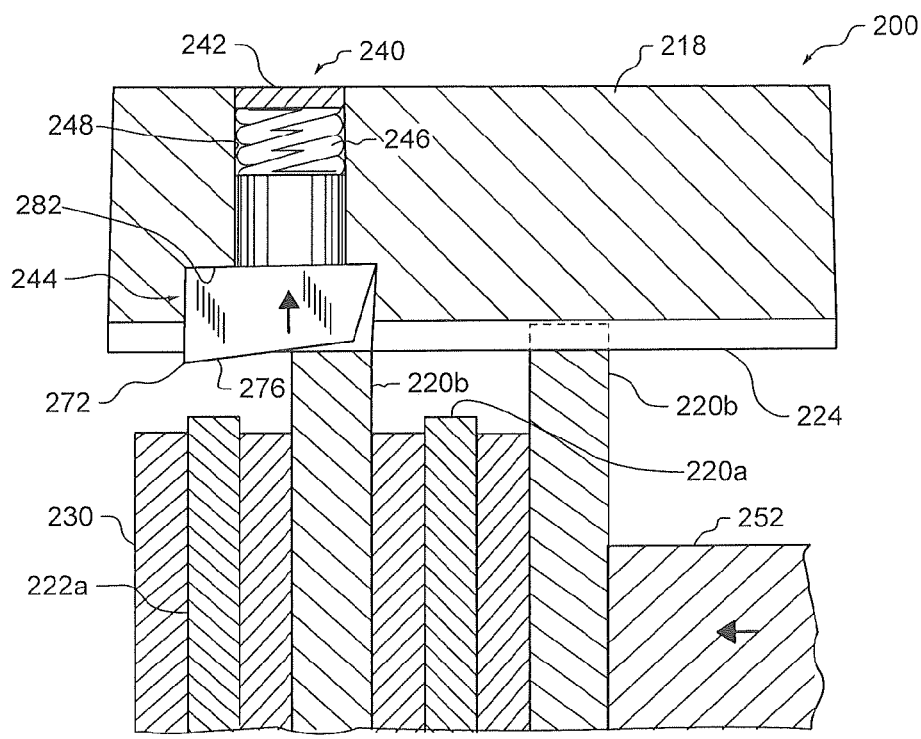
FIG. 5 is an enlarged view similar to that of FIG. 4, but shown engaged in a second, higher, segment of an operating range of torques.

Finally, an interface between the leading edge 274 and the bottom edge 276 of the base portion 272 is defined by a radius 280 configured to control operational characteristics of the transition from lower to higher operational torque ranges, as will be appreciated by those skilled in the art. From this description, it will be clear that the recess 282 may be appropriately shaped to accommodate retraction of the base portion 272 into the housing 218 to accommodate movement of the left-most pressure plate 220*b* against the skate detent units 240 sufficient to cause retraction of the skate detent units 240 during transition between Based upon the above description, the left-most pressure plate 220*b* will engage only the leading edge 274 of the skate 244 during the lowest segment 262 of the operating range of torques 260, due to insufficiency of the actuator pressure to force any retraction of the skate. Once beyond transition, however, referring now to FIG. 5, the left-most pressure plate 220*b* will be forced beyond the leading edge 274, past the radius 280, and into engagement with the bottom edge 276 to force retraction of the skate 244. It is suggested that the left-most pressure plate 220*b* at its most leftward position be designed to always remain in contact with the bottom edge 276 to continually urge retraction of the skate 244 into the recess 282 while the actuator pressures are accommodating the higher segment 266 or the operating range of torques (260). The tolerances between the plate 220*b* and the skate 244 should be such that the plate cannot actually be forced beyond or past the skate. Otherwise, the skate will be unable to return the discs and plates to their pre-transition positions upon reduction of actuator pressures.

It is to be understood that an automatic transmission may represent only one potential application of the dual gain friction clutch 200. Other applications including, by way of example only, differentials, brake units, and machine tools, may also advantageously employ the disclosed dual gain friction clutch 200, as will be readily appreciated by one of ordinary skill in the art. In addition, the elements described as inputs and outputs may be reversed, and/or the skate may have additional configurations other than what is shown and described herein. By way of example only, the clutch could also be configured to provide more than the two gain slopes presented in FIG. 2.

A method of making the dual gain friction clutch 200 for transmitting an operational range of torques 260 from a drive member 214 to a driven member 218 may include the steps of:

configuring a first friction clutch pack 220 to include a first friction disc element 220*a* adapted to be coupled to the drive member 214 and a first pressure plate element 220*b* adapted to be coupled to the driven member 218;

configuring a second friction clutch pack 222, axially adjacent the first friction clutch pack 220, to include a second friction disc element 222*a* adapted to be coupled to the drive member, a second pressure plate element 222*b* adapted to be coupled to the driven member 218;

providing at least one spring-loaded skate detent unit 240 between the first and second clutch packs 220, 222, the skate detent unit being configured to separate the two clutch packs during a lower segment 262 of an operational range of torques 260;

coupling an actuator assembly 250 to the first friction clutch pack 220 to axially operate sequentially the first friction clutch pack 220 and then the second friction clutch pack 222; and configuring the actuator assembly 250 to force the first clutch pack 220 into the skate detent unit 240 sufficiently to force retraction of the skate detent unit 240 and thereby transition the dual gain friction clutch 200 to a higher segment 266 of the operational range of torques 260.

The described method may further include the step of configuring the left-most pressure plate 220*b* to be juxtaposed directly against the skate detent unit 240, and configuring the first friction clutch pack 200 to be movable from an unengaged position to a torque transmitting position corresponding to a first segment 262 of the operational range of torques 260 under which a force supplied by the actuator assembly 250 is less than required to bias the first friction clutch pack 220 into the skate detent unit 240.

Finally, the method may also include the step of configuring the dual gain friction clutch 200 to include first and second friction clutch packs 220, 222, the first clutch pack 220 being adapted to interact with the skate detent unit 240 to force retraction of the skate detent unit 240 to cause the second friction clutch pack 222 to engage, corresponding to a second segment 266 of the operational range of torques 260, under which a force supplied by the actuator assembly 250 becomes greater than required to compress the skate detent unit 240.

INDUSTRIAL APPLICABILITY

The disclosed dual gain friction clutch may advantageously be used in a transmission of a vehicle, in a machine, or in other devices. The clutch includes first and second friction clutch packs juxtaposed axially together and configured to facilitate transmission of two distinct ranges of operational torques between a drive and a driven member. A spring loaded skate detent unit facilitates transition between torque modes. As disclosed, the skate detent unit may permit smaller axial dimensions of the dual gain friction clutch.

Finally, the disclosed dual gain friction clutch may be coupled to either a simple hub or to a one-way clutch to achieve several additional operational modes not described herein. Such modes, by way of example only, may include a dual gain friction clutch that may be either 1) locked in one direction, and free-wheeling in the opposite direction; 2) a low torque friction clutch in one direction; 3) a low torque friction clutch in both directions; and (4) a mechanically locked clutch in both directions.

What is claimed is:

1. A dual gain friction clutch for transmitting an operational range of torques from a drive member to a driven member, comprising:

a first friction clutch pack including first friction disc elements coupled to the drive member and first pressure plate elements coupled to the driven member;

a second friction clutch pack including second friction disc elements coupled to the drive member and second pressure plate elements coupled to the driven member, the second clutch pack adapted to operate in juxtaposition with the first friction clutch pack;

at least one spring-loaded skate detent unit disposed between the first and second clutch packs, the skate detent unit being radially positioned within an aperture of the driven member, the aperture of the driven member including a recess to accommodate retraction of the skate detent unit into the aperture, the skate detent unit being configured to bias the respective clutch packs apart during a lower segment of the operational range of torques; and an actuator assembly operatively configured to cause one of the first pressure plate elements of the first clutch pack to interact with the first friction clutch pack to force the retraction of the skate detent unit into the aperture, causing engagement of the second friction clutch pack and the dual gain friction clutch to transition to a higher segment of the operational range of torques.

2. The dual gain friction clutch of claim 1, in which the first friction clutch pack is movable from an unengaged position to a torque transmitting position when a force supplied by the actuator assembly is less than a force required to move the first clutch pack into a biasing interaction with the skate detent unit.

3. The dual gain friction clutch of claim 2, in which the force supplied by the actuator assembly corresponds to a first segment of the operational range of torques.

4. The dual gain friction clutch of claim 1, in which both the first and second friction clutch packs are movable from a disengaged position to an engaged position when a force supplied by the actuator assembly becomes greater than a force required to compress the skate detent unit, corresponding to a second portion of the operational range of torques.

5. The dual gain friction clutch of claim 1, in which the skate detent unit includes a spring-loaded skate, the skate including an angled leading edge and an angled bottom edge joined at a sharp corner.

6. The dual gain friction clutch of claim 5, in which the angle of the leading edge is adapted to resist retraction of the skate by actuator assembly forces whenever the friction clutch is operating within the lower segment of the operational range of torques.

7. A transmission clutch unit configured for transmitting an operational range of torques from a drive member to a driven member, comprising:
a dual gain friction clutch defined by a first friction clutch pack and a second friction clutch pack, the dual gain friction clutch being operable in a first mode across a first segment of an operational range of torques, and operable in a second mode across a second segment of the operational range of torques;
an actuator assembly including an actuator piston operatively configured to axially force engagement of the first friction clutch pack, and then engagement of the second friction clutch pack; and
a plurality of spring-loaded skate detent units supported and radially oriented within the driven member, each skate detent unit having radially inwardly depending individual spring-loaded skates being operatively configured to retract under a transition force adapted to separate the first segment of the operational range of torques from the second segment of the operational range of torques, the spring-loaded skate defining an angled leading edge and an angled bottom edge, the angle of the leading edge being adapted to resist retraction of the skate by the force of the actuator piston whenever the friction clutch is operating within the lower segment of the operational range of torques, the skate detent unit including a spring reaction member, and the skate having a base portion, an anchor portion integral to the base portion, and a spring interposed between the reaction member and the anchor portion.

8. The transmission clutch unit of claim 7, in which the leading edge and the bottom edge are both on the base portion, wherein the leading edge and the bottom edge define a radius therebetween, the radius being sized and configured to control characteristics of the transition between the lower segment and the higher segment of the operational range of torques.

9. The transmission clutch unit of claim 8, wherein the driven member contains an aperture adapted to contain the skate detent unit, and wherein the aperture includes a recess to accommodate retraction of the base portion of the skate.

10. A method of making a dual gain friction clutch for transmitting an operational range of torques from a drive member to a driven member, comprising:
configuring a first friction clutch pack to include a first friction disc element adapted to be coupled to the drive member and a first pressure plate element adapted to be coupled to the driven member;
configuring a second friction clutch pack, axially adjacent the first friction clutch pack, to include a second friction disc element adapted to be coupled to the drive member, a second pressure plate element adapted to be coupled to the driven member;
providing at least one spring-loaded skate detent unit radially positioned in an aperture of the driven member and between the first and second clutch packs, the skate detent unit being configured to separate the two clutch packs during a lower segment of an operational range of torques;
providing an actuator assembly to engage the first friction clutch pack to axially operate sequentially the first friction clutch pack and then the second friction clutch pack; and
configuring the actuator assembly to force the first clutch pack into a biasing interaction with the skate detent unit to cause the skate detent unit to retract into a recess of the aperture of the driven member, and the dual gain friction clutch to transition to a higher segment of the operational range of torques.

11. The method of claim 10, further including the step of configuring the first pressure plate element to be juxtaposed directly against the skate detent unit, and configuring the first friction clutch pack to be movable from an unengaged position to a torque transmitting position corresponding to a first portion of the operational range of torques under which a force supplied by the actuator assembly is less than required to force the first friction clutch pack into biasing interaction with the skate detent unit to cause the retraction thereof.

12. The method of claim 10, further including the step of configuring the first clutch pack to be movable into a biasing interaction with the skate detent unit to engage the clutch pack, corresponding to a second portion of the operational range of torques when a force supplied by the actuator assembly becomes greater than required to retract the skate detent unit.

13. The method of claim 10, further including the step of configuring the skate detent unit to have a base portion including an angled leading edge, and an angled bottom edge, the angled leading edge and the angled bottom edge joining at a sharp corner, the angle of the bottom edge being shallower than the angle of the leading edge.

\* \* \* \* \*